UNITED STATES PATENT OFFICE.

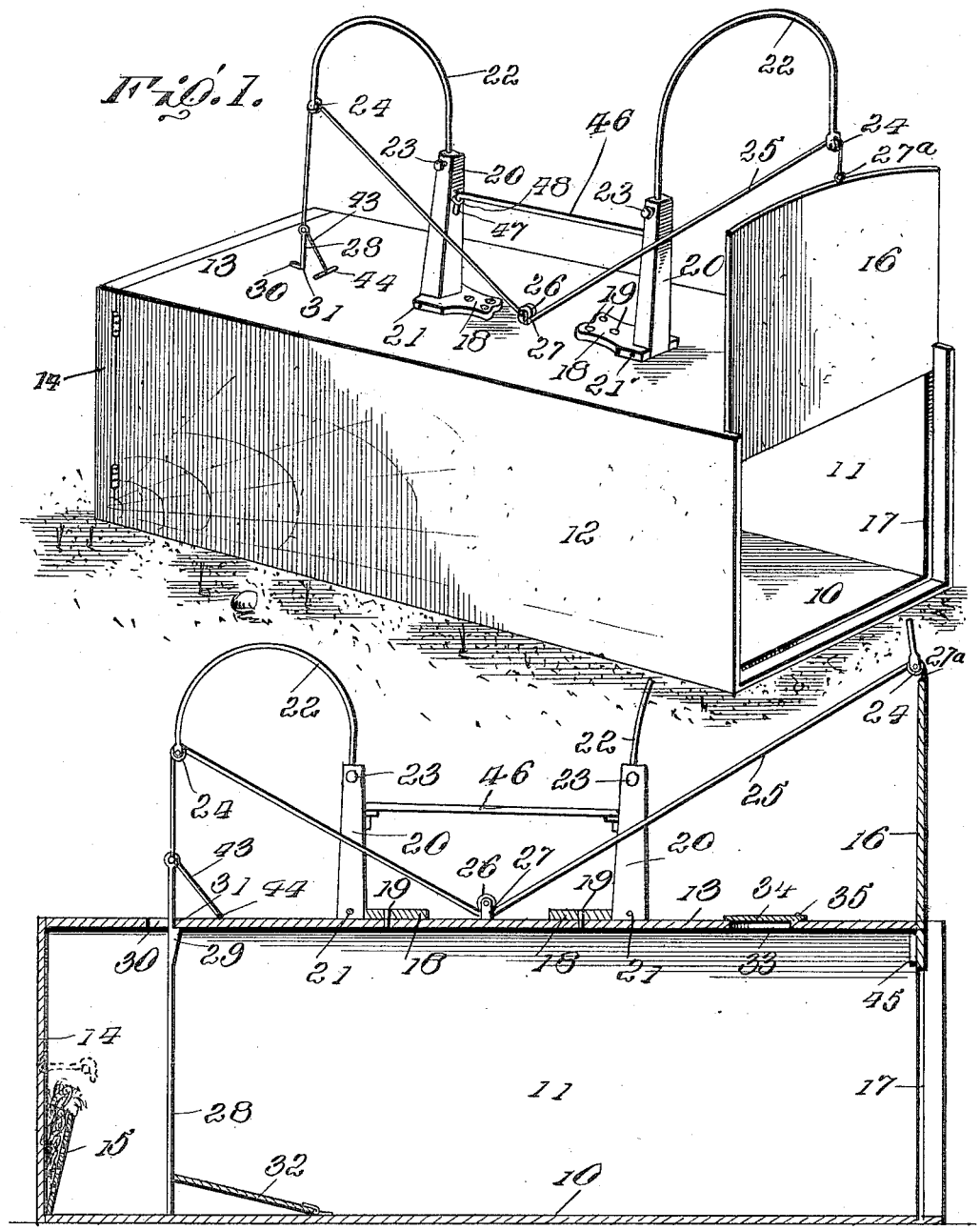

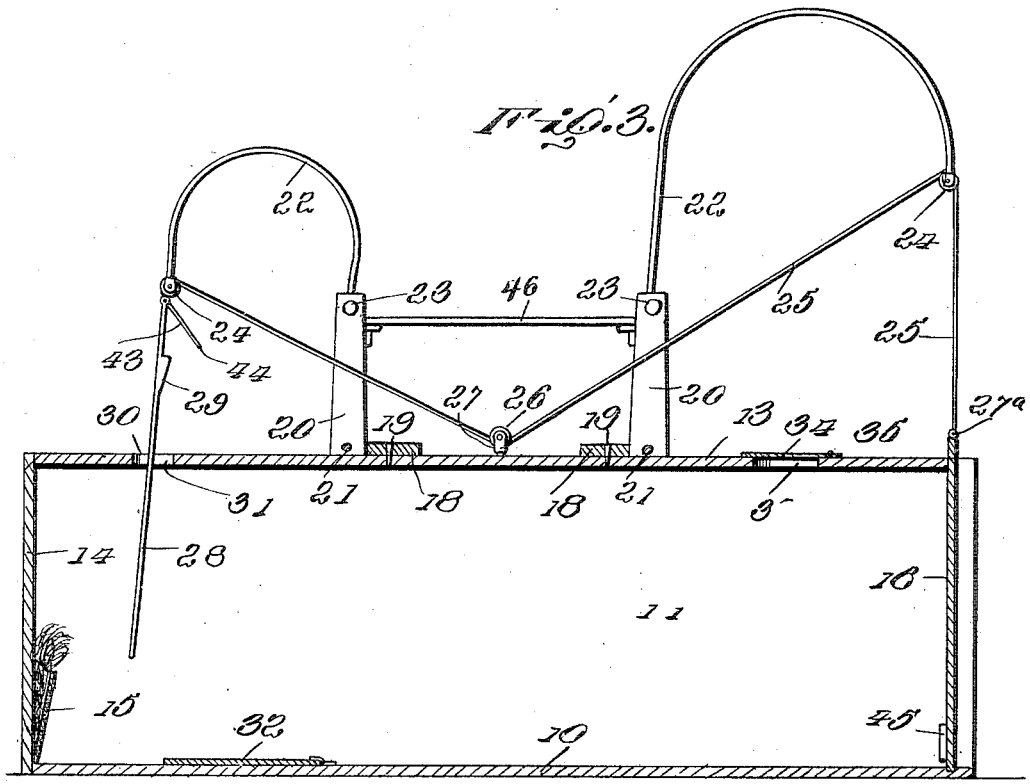

JOHN F. DRAPER, OF ALBIA, IOWA, ASSIGNOR OF ONE-HALF TO JOHN J. TAGLAUER, OF ALBIA, IOWA.

ANIMAL-TRAP.

971,530.

Specification of Letters Patent.

Patented Oct. 4, 1910.

Application filed June 8, 1910. Serial No. 565,766.

*To all whom it may concern:*

Be it known that I, JOHN F. DRAPER, citizen of the United States, residing at Albia, in the county of Monroe and State of Iowa, have invented certain new and useful Improvements in Animal-Traps, of which the following is a specification.

This invention relates to traps having special reference to an improved animal trap adapted particularly for rabbits, squirrels, minks, and the like.

The invention contemplates a structure of trap whereby the same may be converted from a trap for animals of the size of rabbits into a trap for rats and mice.

The invention has for an object to provide a simply constructed, a strong and an efficient trap which may be partially knocked down for shipment, packing or the like.

For a full understanding of the invention reference is to be had to the following description and accompanying drawings, in which:—

Figure 1 is a perspective view of the improved trap, the parts thereof being set. Fig. 2 is a longitudinal vertical section through the same. Fig. 3 is a similar view disclosing the trap in a closed position. Fig. 4 is a detail view of the forward end of the trap showing an attachment to the same for adapting the trap to small animals. Fig. 5 is a detail perspective view of the attachment.

Corresponding and like parts are referred to in the following description and indicated in all the views of the accompanying drawings by the same reference characters.

Referring to the drawings the trap comprises a relatively long and narrow body composed of a bottom 10, sides 11 and 12 and a top 13. The inner end of the trap is provided with a hinged door 14 forming the end-wall of the trap. The door 14 is provided with a bait pocket 15 comprising a sheet of metal which is secured across the lower portion of the door 14 and having its upper end looped outwardly to receive the bait. The strip of metal is preferably perforated for the purpose of attracting the attention of animals to be caught. The outer end of the trap is provided with a vertically sliding shutter 16 which is formed of a relatively thin substance and slidably disposed in grooves 17 formed in registration in the inner faces of the sides 11 and 12 and the bottom 10. The grooves 17 are formed adjacent the forward extremity of the trap. The top 13 is provided with a pair of spaced blocks 18 which are forked at their outer ends, the forked ends extending toward the ends of the trap, and are secured to the cover 13 by wood screws 19. A pair of standards 20 are carried upon the top 13 engaging between the arms of the blocks 18 at their lower extremities and being retained in such position by the provision of detachable pins 21. The upper ends of the standards 20 are apertured for the reception of the inner extremities of the arched arms 22 which are secured in various adjusted angles about the standards 20 by set-screws 23. The set-screws 23 engage through the sides of the standards 20 and with the inner ends of the arms 22. Pulleys 24 are mounted in the outer extremities of the arms 22 and support thereover a connecting cord 25. A third pulley 26 is mounted in a suitable bracket 27 upon the upper side of the cover 13 midway between the standards 20. The forward end of the cord 25 is attached to the upper edge of the shutter 16 by an eye 27ª which is carried by the shutter. The rear extremity of the cord 25 depends from the rear pulley 24 and is attached to a trigger 28. The trigger 28 is in the form of a bar having a lateral projection 29 forming a shoulder adjacent the upper end of the trigger. The cover 13 is suitably apertured as at 30 to loosely receive the trigger 28 and the projection 29 therethrough. The marginal edge of the opening 30 is flattened at one side to provide a lip 31 to snugly receive the projection 29, in order to hold the shutter 16 in a set position, as is disclosed in Fig. 2. A tripping leaf 32 is hinged upon the bottom 10 forwardly of the trigger 28, the free or rear edge of the tripping leaf 32 resting loosely against the lower end of the trigger 28 when the same is set.

The cover 13 is apertured as at 33 at a point forwardly of the outer block 18. The aperture 33 is normally closed by a slide 34 which is hinged at one side upon a pin 35 passing through the cover 13. The opening 33 may be used for the purpose of ventilation when the trap is employed for large game. It is provided for the reception of a detachable tripping mechanism when the trap is employed for rats and mice. The tripping mechanism, as is disclosed in Figs. 4 and 5, comprises a flange 36 carrying a cylinder 37 depending from the inner edge thereof. The cylinder carries an inwardly extending flange 38 at its lower end to receive a disk 39 which is hinged within the flange 38, as at 40, and held in a closed position through the medium of a weight 41. The weight 41 is carried upon the outer end of an arched arm 42 extending laterally from the disk 39 at a point midway between the hinges 40. The outer edge of the disk, or the edge opposite from the arm 42 rests against the inner beveled edge of the flange 38, while the rear edge of the disk is adapted for movement upwardly within the cylinder 37 when the weight of an animal is disposed upon the outer portion of the disk.

The trigger 28 carries a brace 43 in the form of a diagonal arm depending from the upper end of the trigger and having a cross arm 44 upon its lower extremity to rest upon the cover 13. The cross arm 44 holds the brace 43 from lateral movement to retain the trigger 28 in a substantially vertical position and to insure the release of the same.

Referring to Fig. 1 the trap is disclosed as set. In this position, the trigger 28 is drawn downwardly through the opening 30, and the projection 29 engages against the under side of the lip 31. The trigger 28 holds the cord 25 taut to retain the shutter 16 in a raised position to open the outer end of the trap. The pocket 15 is provided with bait, and when the animal enters the trap and attempts to procure the bait, the animal steps upon the tripping leaf 22 and swings the same into a downward position. This movement of the leaf 32 forces the lower end of the trigger 28 backwardly and removes the projection 29 from the lip 31, whereupon the weight of the shutter 16 upon the cord 25 draws the trigger upwardly through the opening 30. The shutter 16 thus falls into a closed position and the animal in the trap is prevented from escaping. The trap is designed to be relatively narrow so that the animal which is caught therein cannot turn, although this feature is not necessary to the effective operation of the trap.

When the trap is employed in connection with small animals, such as rats and the like, the attachment which is disclosed in Figs. 4 and 5 is inserted through the cover 13ª after the slide 34ª has been moved opened or in the position disclosed in Fig. 4. The cylinder 37 is inserted through the opening in the cover 13ª to engage the flange 36 upon the cover about the opening to support the cylinder 37 in position. When in this position the bottom of the cylinder, or the disk 39 is spaced upwardly from the bottom 10ª of the top so that the animal entering the cylinder 37 falls through the bottom thereof and into the trap.

The slide 16 is provided across its inner face and adjacent to its lower edge with a protecting strip 45, acting as a weight to insure the dropping of the door or shutter 16 into a closed position when released by the trigger 28.

The standards 20 are reinforced by a detachable brace-rod 46 having downturned fingers 47 at its ends to engage in screw eyes 48 carried in the inner opposite point of the standards.

Having thus described the invention what is claimed as new is:—

1. A trap including an elongated and narrow body having registering grooves in its bottom and sides, a hinged rear door upon the body, a bait pocket carried against the inner side of the door, a shutter mounted for sliding movement in the grooves at the forward end of the body, supporting arms extending upwardly from the body, a cord slidably disposed through the outer ends of the arms and attached at its forward end to said shutter, a trigger carried upon the rear end of the cord and depending through the body, and a tripping leaf arranged within the body for coöperation with the trigger.

2. A trap including a relatively long and narrow body, a hinged door upon the rear end of the body, a pocket carried against the inner face of the door, a shutter arranged at the outer end of the body for closing the same, arms arranged upon the body, a cord carried through the outer ends of the arms and attached to said shutter, a trigger attached to the rear end of the cord and depending through the body, a lip formed in the body to detachably receive the trigger, and a tripping leaf arranged within the body for moving the trigger to release the same from said lip.

3. A trap including a body, a hinged door closing the rear end of the body, a pocket carried by the door for the reception of the bait, a shutter slidably carried for vertical movement at the outer end of the body, detachable standards carried upon the upper face of the body, adjustable arms carried by the standards, a cord carried through the outer ends of the arms and attached to said shutter, a trigger depending from the opposite end of the cord into the body, a shoulder formed on the upper end of the trigger, a lip formed upon the body for coöperation with the shoulder to hold the trigger down, and a tripping leaf mounted within the body for swinging said trigger to release the same.

4. A trap including a body, a hinged door closing the rear end of the body and having a pocket in its inner wall, a shutter slidably disposed in the outer end of the body for closing the same, blocks carried by the body, standards detachably mounted in the blocks, arched arms adjustably disposed in the upper ends of the standards, pulleys arranged in the outer ends of the arms, a cord passing over the pulley and connected at one end to said shutter, a trigger depending from the opposite end of the cord through the cover of the body, a lip formed in the cover of the body adjacent the trigger, a shoulder formed on the trigger for engagement against the lip, and a tripping leaf mounted in the body to swing the trigger and release the shoulder from said lip upon the downward movement of the leaf.

5. A trap including a body, a hinged door closing the end of the body, a strip of metal engaging across the inner face of the door and being looped outwardly at its upper end to form a pocket for receiving bait, a tripping leaf hinged within the body adjacent to the bait pocket, a rod depending through the body and resting against the outer end of the tripping leaf, a shoulder formed upon the rod at its upper end, a lip formed upon the body for engagement with the shoulder to hold the rod down within the body, arms upwardly extending from the body, a cord carried through the ends of the arms and attached at its inner end to said rod, and a shutter slidably disposed in the outer end of the body and connected to the opposite end of the cord for normally holding the shutter up.

In testimony whereof, I affix my signature in presence of two witnesses.

JOHN F. DRAPER. [L. S.]

Witnesses:
ELIJAH C. ARMSTRONG,
JOE M. BAIRD.